United States Patent Office 3,008,878
Patented Nov. 14, 1961

3,008,878
PROCESS FOR THE RECOVERY OF
UR-FACTOR AND RELAXIN
Johannes Keck, Biberach an der Riss, Germany, assignor to Dr. Karl Thomae G.m.b.H., Biberach an der Riss, Germany, a corporation of Germany
No Drawing. Filed Oct. 20, 1958, Ser. No. 768,012
Claims priority, application Germany Oct. 21, 1957
8 Claims. (Cl. 167—74)

This invention relates to an improved process for the recovery of a concentrate of an active substance from ovaries or placentas, especially from swine's ovaries, which substance is active in the uterus as in the ligamentum pubis.

It is already known that substances which influence the reproductive organs can be extracted from the corpus luteum or from ovaries (J. C. Krantz, Jr., H. H. Bryant and C. J. Carr, Surg. Gynecol. Obst., 90, 372–375 (1950); L. C. Felton, E. H. Frieden, H. H. Byrant, J. Pharmacol. Exper. Ther., 107, 160–164 (1953) and German Patent No. 948,909). Two factors are responsible for the activity of the extract obtained, namely those which have been designated as "uterine relaxing factor" (UR-factor) and "relaxin." These two closely related but not identical factors, which differ, for example, in their biological points of activity on the uterus and on the ligamentum pubis, respectively, are assumed to be albumins or substances closely related to albumins. A sharp chemical separation of these active factors has so far not been successful. In each of the above-mentioned literature references only one of the two factors is made reference to, depending upon the author. However, a mixture of UR-factor and relaxin is always obtained, and this mixture shall hereinafter be referred to as "active substance." The known processes for the extraction and isolation of the "active substance" involve numerous steps and are therefore extremely complicated, expensive and time-consuming. Furthermore, they produce low yields of a material having a low activity.

An object of my invention is to develop an improved process for obtaining the active substances uterine relaxing factor (UR-factor) and relaxin from ovaries and placenta in good yields of highly active material.

Another object of my invention is to develop a process which will selectively extract the active substances uterine relaxing factor and relaxin from both non-select swine's ovaries and placenta and pregnant sows' ovaries and placenta.

These and further objects of my invention will appear as this description proceeds.

I have found that the active substance, a mixture of UR-factor and relaxin can be obtained in very simple fashion and with surprisingly high yields by extracting ovaries or placenta tissue, especially swine's ovaries, with acidic, aqueous, water-miscible organic solvents or with acidic, aqueous solutions alone, and separating the active substance, a mixture of UR-factor and relaxin, directly from this extract by precipitating with the aid of a large volume of a water-miscible organic solvent.

In this manner the active substance, a mixture of UR-factor and relaxin, is obtained with a yield of between 1.0 and 4.0%, based on the weight of the fresh ovaries, having an active substance content of between 500 and 2000 units per mg. Hence, the process according to my invention is characterized by high yields of an extract with a high active substance content and by simplicity.

The process according to my invention may be carried out with comminuted animal organs selected from the group consisting of ovaries and placenta. While any source of these organs can be employed, I have found that those organs obtained from swine are both inexpensive, readily available and give high yields according to my process. It is not necessary to utilize ovaries from pregnant swine, although such ovaries give a slightly higher yield of an active substance having a high activity per mg. I usually use non-select ovaries, that is all ovaries as they occur, with excellent results.

The process according to my invention is generally carried out at room temperature, but temperatures somewhat above or below room temperature may also be used. The period of extraction may be varied within wide limits. Particularly favorable results may be achieved with extraction periods of 5–25 hours at room temperature.

Acetone is advantageously used as the water-miscible organic solvent for the extraction of the ovaries or the placenta tissue. The extraction is preferably carried out with acetone having a water content of 20–90% and an acid content between 0.01 N and 1.0 N based on the total solvent, preferably with an acid content between 0.05 N and 0.4 N. However, other water-miscible organic solvents may also be used, such as methanol, ethanol, dioxane, tetrahydrofuran, acetonitrile and the like in the form of aqueous solutions with the above content of water.

For the performance of the extraction according to the invention with acidic aqueous solutions alone, an acid having a normality between 0.01 N and 1.0 N. and preferably between 0.05 N and 0.5 N in water is used. Hydrochloric acid has been found to be particularly suitable. However, other mineral acids, such as, sulfuric acid, phosphoric acid or organic acids, such as, acetic acid, may also be used in the extraction process both in the embodiment using acid and water alone or the embodiment using water, a water-miscible organic solvent and an acid.

The extract solutions thus obtained are then directly admixed with a large volume of a water-miscible organic solvent for the purpose of separating out the active substance as a precipitate. For this purpose acetone again can be advantageously used. Depending upon the particular solvent content of the extract, from 4 to 10 times the volume of the solvent is added for precipitation of the active substance. Examples of other suitable water-miscible organic solvents for use in the precipitation step are, acetonitrile, dioxane, and tetrahydrofuran and the like. It is not necessary to precipitate the active substance with the same solvent as was used in the extraction step.

The process according to my invention is also suitable for the extraction of ovaries of pregnant swine, which are known to have a high content of relaxin as well as of UR-factor (see L. C. Felton, E. H. Frieden, H. H. Byrant, J. Pharmacol. Exper. Ther., 107, 160–164 (1953)).

The active substance, a mixture of UR-factor and relaxin, obtained in accordance with the present invention is a colorless substance the infra-red spectrum of which exhibits bands at about $3.0\mu$, $3.5\mu$, $6.08\mu$, $6.58\mu$, $6.9\mu$, and $8.1\mu$ (measured in potassium bromide). The nitrogen content of this substance is about 14.3%.

The pharmacological tests of the active substance were carried out according to the method described by J. C. Krantz, Jr., H. H. Bryant and C. J. Carr (loc. cit.). The unit of activity of the active substance in these tests is the minimal amount which, when injected intravenously, effects a 90% reduction of intensity of spontaneous contractions for a period of at least ten minutes.

The following table shows the great superiority of the process according to my invention over the known processes.

| Method of Extracting the Active Substance | Yield per weight of animal organs, percent | Effectiveness in units/mg. |
| --- | --- | --- |
| German Patent No. 948,909 | 0.14 | About 1,000.[1] |
| L. C. Felton, E. H. Frieden, H. H. Bryant (loc. cit.) | 0.2 | 3-100. |
| Example 1 of this application | 1.08 | About 2,000. |
| Example 2 of this application | 3.95 | About 500. |

[1] The active substance contains varying amounts of sodium chloride.

From this table it can be seen that the process according to my invention makes it possible to isolate from about 5 to about 15 times the amount of active substance from the same amount of ovaries as compared to the known processes, and that simultaneously an enrichment of five times or more of the concentration of active ingredient in this extract takes place.

The following examples illustrate my invention without limiting it.

*Example I*

2.5 kg. of non-select swine's ovaries, which had been comminuted in a meat chopper, were admixed with an extracting solution consisting of 5.0 liters of acetone, 2.83 liters of water and 0.17 liter of concentrated hydrochloric acid, and were extracted for 24 hours at room temperature accompanied by gentle stirring. Subsequently, the solution was separated from the ovaries residue by filtration, and the filter cake was washed with the above-mentioned extracting solution. In order to increase the yield, the ovaries residue was again extracted in the same manner with the same amount of aqueous hydrochloric acid-acetone extracting solution, and the ovaries residue was again separated by filtration.

The combined clear, weakly brown extract solutions were admixed with 4 to 5 times their volume of acetone. A colorless, flocculent precipitate formed, which was filtered off, washed with acetone and dried over calcium chloride in a desiccator.

Yield: 27.0 gm. (1.08%).
Effectiveness: about 2000 units/mg.

*Example II*

1.0 kg. of fresh, comminuted, non-select swine's ovaries were extracted with 3 liters of 0.1 N hydrochloric acid for 5 hours at room temperature, accompanied by gentle stirring. Subsequently, the solution was separated from the ovaries residue by filtration, and the filter cake was washed with 0.1 N hydrochloric acid. In order to increase the yield, the ovaries were again extracted in the same manner with the same amount of 0.1 N hydrochloric acid and the residue was again filtered off.

The combined clear, brownish extract solutions were admixed with 10 times their volume of acetone. A colorless, flocculent precipitate separated out which was filtered off, washed with acetone and dried over calcium chloride in a desiccator.

Yield: 39.5 gm. (3.95%).
Effectiveness: about 500 units/mg.

*Example III*

1.0 kg. of fresh, comminuted, non-select swine's ovaries were extracted with a solution consisting of 1.8 liters of acetone, 1.185 liters of water and 0.015 liter of 85% phosphoric acid for 20 hours at room temperature, accompanied by gentle stirring. Subsequently, the ovaries residue was separated by filtration and was washed with the above-mentioned extracting solution. The clear, brownish extract solution was admixed with 5 times its volume of acetone. A colorless, flocculent precipitate separated out, which was filtered off, washed with acetone, and dried over calcium chloride in a desiccator.

Yield: 30.3 gm. (3.03%).
Effectiveness: about 750 units/mg.

*Example IV*

0.7 kg. of comminuted, non-select swine's ovaries were admixed with a solution consisting of 1.47 liters of acetonitrile, 0.594 liter of water and 0.036 liter of concentrated hydrochloric acid, and extracted for 18 hours at room temperature accompanied by gentle stirring. Subsequently, the ovaries residue was filtered off and was washed with the above-mentioned extracting solution. The clear dark brown extract solution was admixed with 6 times its volume of acetone, whereby, a colorless, flocculent precipitate separated out which was filtered off, washed with acetone and dried over calcium chloride in a desiccator.

Yield: 13.7 gm. (1.96%).
Effectiveness: about 1000 units/mg.

*Example V*

1.0 kg. of comminuted, non-select swine's ovaries were extracted with a solution consisting of 2.0 liters of dioxane, 1.131 liters of water and 0.069 liter of concentrated hydrochloric acid for 20 hours at room temperature, accompanied by gentle stirring. Subsequently, the solution was filtered off from the ovaries residue, and the filter cake was washed with the above-mentioned extracting solution.

The clear brown extract solution was admixed with 8 times its volume of dioxane, whereby a brownish, flocculent precipitate formed which was filtered off, washed with dioxane and dried over calcium chloride in a desiccator.

Yield: 12.6 gm. (1.26%).
Effectiveness: about 750 units/mg.

*Example VI*

357 gm. of comminuted ovaries of pregnant swine were extracted with a solution consisting of 0.7 liter of acetone, 0.4 liter of water and 0.025 liter of concentrated hydrochloric acid for 12 hours at room temperature, accompanied by gentle stirring. The solvent was then filtered off from the ovaries residue and the filter cake was washed with the above-mentioned extracting solution. Subsequently, the ovaries were again extracted as above with the same amount of aqueous hydrochloric acid-acetone solution.

The combined, brownish extract solutions were admixed with 5 times their amount of acetone. A colorless, flocculent precipitate separated out, which was filtered off, washed with acetone and dried over calcium chloride in a desiccator.

Yield: 4.22 gm. (1.18%).
Effectiveness: about 2000 units/mg.

*Example VII*

1.0 kg. of comminuted, non-select swine's ovaries were extracted with a solution consisting of 2.0 liters of tetrahydrofuran, 1.13 liters of water and 0.07 liter of concentrated hydrochloric acid for 20 hours at room temperature, accompanied by gentle stirring. Subsequently, the solvent was filtered off from the ovaries residue, and the filter cake was washed with the above-mentioned extracting solution.

The clear, brown extraction solution was then admixed with 8 times its volume of tetrahydrofuran, whereby a brownish, flocculent precipitate was formed. The precipitate was filtered off, washed with tetrahydrofuran and dried over calcium chloride in a desiccator.

Yield: 19.5 gm. (1.95%).
Effectiveness: about 1000 units/mg.

Example VIII 0.5 kg. of comminuted, non-select swine's ovaries were extracted with a solution consisting of 1.0 liter of acetone, 0.566 liter of water and 0.034 liter of concentrated hydrochloric acid for 3 hours at 40° C., accompanied by gentle stirring. Subsequently, the solution was filtered off from the ovaries residue, and the filter cake was washed with the above-mentioned extracting solution.

The clear, brown extract solution was admixed with 5 times its volume of acetone, whereby a colorless, flocculent precipitate separated out, which was filtered off, washed with acetone and dried over calcium chloride in a desiccator.

Yield: 6.4 gm. (1.28%).
Effectiveness: about 500 units/mg.

Example IX 1.0 kg. of comminuted, non-select swine's ovaries were introduced into a solution consisting of 2.0 liters of acetone, 1.13 liters of water and 0.07 liter of concentrated hydrochloric acid, the mixture having been pre-cooled to 2° C. The entire mass was then extracted for 7½ hours at a temperature of 1–2° C. accompanied by gentle stirring. The ovaries residue was then separated at the same temperature and the clear brown extract solution was admixed with 5 times its volume of acetone, whereby a colorless, flocculent precipitate was formed. This precipitate was filtered off, washed with acetone and dried over calcium chloride in a desiccator.

Yield: 9.6 gm. (0.96%).
Effectiveness: about 1000 units/mg.

Example X

The extraction of the ovaries may also be carried out continuously. For this purpose four extraction columns (height 90 cm., diameter 8 cm.) provided with stirring devices are arranged in series. The extracting solvent mixture, consisting of 6 parts by volume of acetone, 3.4 parts by volume of water and 0.207 part by volume of 36% hydrochloric acid, was passed through the columns filled with ovaries at a rate of 0.9–1.0 liter/hr. from the bottom to the top. The contents of the columns are very carefully stirred at intervals of 10–20 minutes. The non-select, finely comminuted swine's ovaries are intimately admixed with barium sulfate in a ratio of 5:1 prior to placing them into the columns. The barium sulfate causes rapid settling of the comminuted ovaries so that upon careful extraction a clear extract solution leaves the top of the columns.

Each extraction column is charged with a mixture consisting of 1.5 kg. ovaries and 0.3 kg. barium sulfate. Once the continuous extraction is proceeding, the ovaries which have been subjected to the extraction for the longest time are replaced by fresh ovaries after each withdrawal of 6–8 liters of extract. The extract solution is admixed with 5 times its volume of acetone, whereby a colorless, flocculent precipitate separates out which is filtered off, washed with acetone and dried over calcium chloride in a desiccator.

Yield: 20.1 gm. active substance per 1.5 kg. ovaries (1.34%).
Effectiveness: about 1000 units/mg.

Example XI 3 kg. of placenta tissue, which had been comminuted in a meat chopper, was extracted for 24 hours at room temperature with a solution consisting of 6 liters of acetone, 3.4 liters of water and 0.027 liter of 36% hydrochloric acid, accompanied by gentle stirring. Thereafter, the residue was filtered off and washed with the above-mentioned extracting solution.

The clear brownish extract solution was admixed with 5 times its volume of acetone, whereby a white, flocculent precipitate formed which was filtered off, thoroughly washed with acetone and dried over calcium chloride in a dessicator.

Yield: 18.35 gm.=0.61%.

The above examples illustrate the process of my invention of extracting various types of animal organs with varying acidic solvents being between about 0.01 N to 1 N for varying times at varying temperatures. It is readily apparent to one skilled in the art that other substitution changes and modifications of my invention are possible without departing from the spirit of the invention or the scope of the following claims.

I claim:

1. A process for the production of a concentrate containing the active substances UR-factor and relaxin from comminuted animal organs selected from the group consisting of ovaries and placenta which consists essentially of extracting said animal organs with an acidic solvent of 20 to 100% water and 0 to 80% of a water-miscible organic solvent selected from the group consisting of lower alkanols, acetone, dioxan, tetrahydrofuran and acetonitrile, said acidic solvent having a 0.01 to 1.0 Normal acid concentration, separating the extract from said extracted animal organs, adding to said extract from 4 to 10 times the volume of said extract of a water-miscible organic solvent selected from the group consisting of lower alkanols, acetone, dioxan, tetrahydrofuran and acetonitrile whereby a precipitate of said concentrated active substance occurs and separating said precipitate.

2. A process for the production of a concentrate containing the active substances UR-factor and relaxin from comminuted animal organs selected from the group consisting of ovaries and placenta which consists essentially of extracting said animal organs with an acidic water-miscible organic solvent selected from the group consisting of lower alkanols, acetone, dioxan, tetrahydrofuran and acetonitrile containing 20% to 90% water, said solvent having a 0.05 to 0.4 Normal acid concentration, separating the extract from said animal organs, adding to said extract from 4 to 10 times the volume of said extract of a water-miscible organic solvent selected from the group consisting of lower alkanols, acetone, dioxan, tetrahydrofuran and acetonitrile whereby a precipitate of said concentrated active substance occurs and separating said precipitate.

3. A process for the production of a concentrate containing the active substances UR-factor and relaxin from comminuted animal organs selected from the group consisting of ovaries and placenta which consists essentially of extracting said animal organs with a solution of a mineral acid in water, said solution having a 0.05 to 0.4 Normal acid concentration, separating the extract from said animal organs adding to said extract from 4 to 10 times the volume of said extract of a water-miscible organic solvent selected from the group consisting of lower alkanols, acetone, dioxan, tetrahydrofuran and acetonitrile whereby a precipitate of said concentrated active substance occurs and separating said precipitate.

4. A continuous process for the production of a concentrate containing the active substance UR-factor and relaxin from comminuted animal organs selected from the group consisting of ovaries and placenta which consists essentially of mixing said animal organs with barium sulfate, continuously extracting said mixture with an acidic solvent of 20 to 100% water and 0 to 80% of a water-miscible organic solvent selected from the group consisting of lower alkanols, acetone, dioxan, tetrahydrofuran and acetonitrile, said acidic solvent having a 0.01 to 1.0 Normal acid concentration, separating the extract from said extracted animal organs, adding to said extract from 4 to 10 times the volume of said extract of a water-miscible organic solvent selected from the group consisting of lower alkanols, acetone, dioxan, tetrahydrofuran and acetonitrile whereby a precipitate of said concentrated active substance occurs and separating said precipitate.

5. A process for the production of a concentrate containing the active substances UR-factor and relaxin from comminuted, non-select swine's ovaries which consists essentially of extracting said ovaries with an acetone solution containing 20% to 90% water and sufficient mineral acid to give an acid concentration in said solution of from 0.05 to 0.4 Normal, separating said extracted ovaries from said extract, adding to said extract from 4 to 10 times the volume of said extract of acetone whereby a precipitate of said concentrated active substance occurs and separating said precipitate.

6. The process of claim 5 wherein said mineral acid is hydrochloric acid.

7. The process of claim 5 wherein said extraction is carried out at room temperature.

8. The process of claim 5 wherein said extraction is extended over about 5 to about 25 hours.

References Cited in the file of this patent

UNITED STATES PATENTS 2,852,431     Kroc _____ Sept. 16, 1958

OTHER REFERENCES

Frieden: Recent Progress in Hormone Research, vol. VIII, 1953, Academic Press, New York, pages 336 and 337.